United States Patent [19]

Maynard, Jr. et al.

[11] 4,380,978
[45] Apr. 26, 1983

[54] ELECTROSTATIC DIESEL FUEL INJECTOR

[75] Inventors: Bruce W. Maynard, Jr., Woodland Hills; William T. Webber, Agoura, both of Calif.

[73] Assignee: Rockwell International Corporation, El Segundo, Calif.

[21] Appl. No.: 140,080

[22] Filed: Apr. 22, 1980

[51] Int. Cl.³ .............................................. F02B 3/00
[52] U.S. Cl. .................................. 123/275; 123/270; 123/536; 123/538
[58] Field of Search ............... 123/270, 280, 536, 538, 123/275

[56] References Cited

U.S. PATENT DOCUMENTS

| 2,735,412 | 2/1956 | Kuepfer | 123/280 |
|---|---|---|---|
| 2,766,582 | 10/1956 | Smith | 123/536 |
| 3,878,469 | 4/1975 | Bolasny | 123/538 |
| 3,890,940 | 6/1975 | Ust | 123/270 |
| 4,051,826 | 10/1977 | Richards | 123/538 |
| 4,091,779 | 5/1978 | Saufferer | 123/536 |
| 4,124,003 | 11/1978 | Abe | 123/536 |
| 4,176,637 | 12/1979 | Cole | 123/538 |
| 4,185,593 | 1/1980 | McClure | 123/536 |
| 4,186,692 | 2/1980 | Kawamura | 123/270 |

Primary Examiner—Ronald B. Cox
Attorney, Agent, or Firm—H. Fredrick Hamann; Harry B. Field

[57] ABSTRACT

Precombustor 10 basically comprises electrostatic injector 12, combustion chamber 14, and glow plug 16. The precombustion chamber 14 basically comprises an injector port 40 for housing the electrostatic injector 12, an igniter port 42 for housing the glow plug 16, and a flow passage 44 substantially opposite the injector port 40 for conveying air into the precombustion chamber 14 and combusted gases out from the precombustion chamber 14. The combustion chamber 14 is enhanced by the incorporation of electrical insulation 46 and electrodes 48 along the interior wall of the precombustion chamber 14. The electrostatic fuel injector 12 basically comprises an electroconductive injector body 20 having at least one fuel inlet and at least one fuel outlet, means 22 and 23 for electrically insulating the injector body from the diesel engine, and a means 24 for charging the injector body in a range from about 10,000 to about 100,000 volts.

8 Claims, 5 Drawing Figures

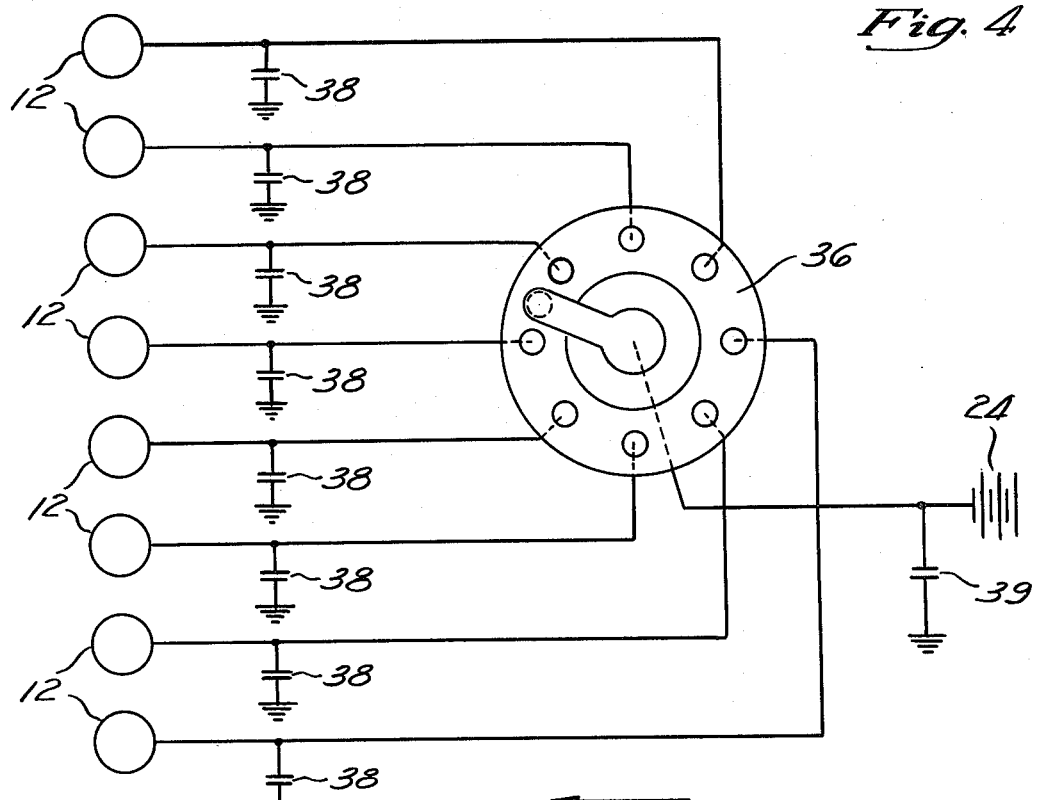
Fig. 4
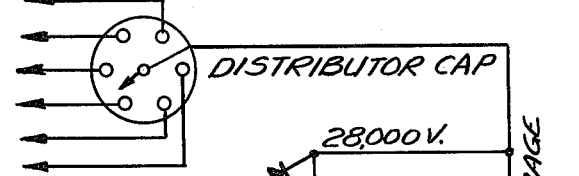
Fig. 5 (PRIOR ART)
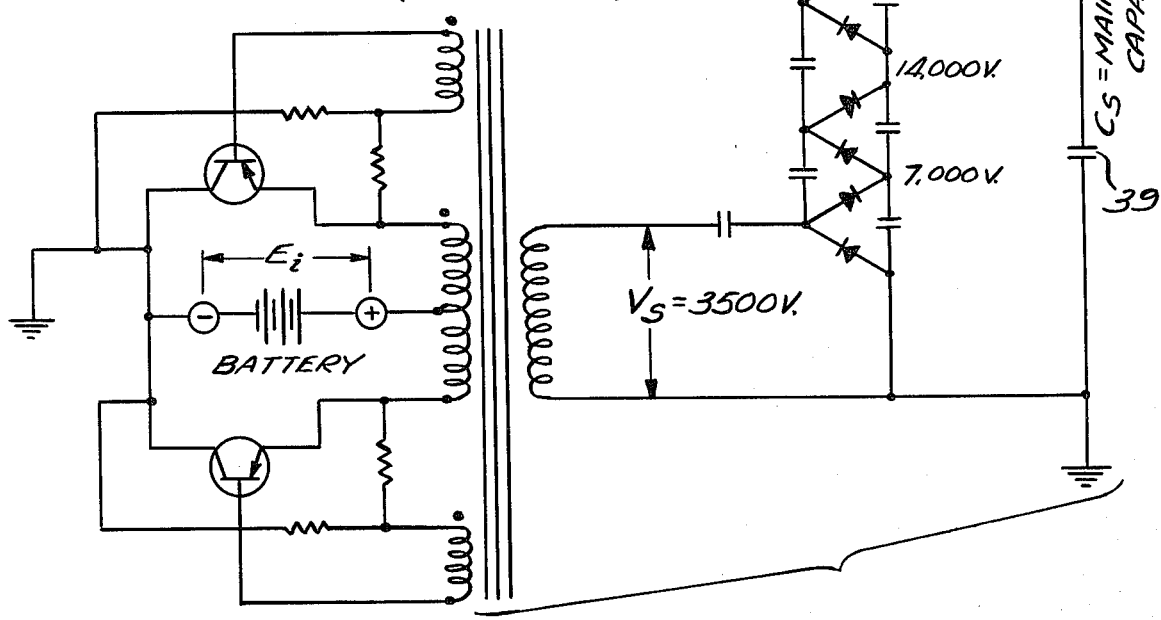

ELECTROSTATIC DIESEL FUEL INJECTOR

BACKGROUND OF THE INVENTION

1. Field of the Invention

The present invention pertains to diesel engines and, more specifically, to incorporating electrostatic injectors into the combustion chamber for atomizing fuel and enhancing efficiency.

2. Description of the Prior Art

Diesel engines designed according to the precombustion chamber system have the combustion chamber divided into a precombustion chamber, which is incorporated into the cylinder head, and a main combustion chamber which is positioned between the bottom edge of the cylinder head and the head or crown of the piston. The precombustion chamber into which the fuel is injected and in which combustion initially takes place, is connected to the main combustion chamber by means of a narrow slot or flow passage.

In operation, as the piston moves in the direction of the cylinder head air is forced into the precombustion chamber, and near the end of this compression stroke fuel is injected into the precombustion chamber. Subsequently, the combustion products are returned through the flow channel from the precombustion chamber into a secondary combustion chamber formed in the piston head. The combustion of this fuel-air combination generates the thrust necessary to produce the power stroke of the piston.

It should be noted that although U.S. Pat. No. 4,122,804 to Kingsbury et al decribes a diesel engine designed in accordance with precombustor theory and having a precombustion chamber using a pencil-type fuel injector, Kingsbury et al does not teach a system for electrostatically injecting fuel into the combustion chamber, nor any means for electrically insulating the precombustion chamber.

SUMMARY OF THE INVENTION

Accordingly, there is provided by the present invention a precombustor which basically comprises an electrostatic injector, a combustion chamber, and a glow plug. The electrostatic fuel injector comprises an electroconductive injector body, electrical insulating means, and a high voltage source which operates in a range from about 10,000 to about 100,000 volts. Fuel injection can be enhanced by the incorporation of a check valve into the electroconductive injector body. This check valve not only provides a means for preventing backflow into the electrostatic injector, but also aids in the breaking off of fine fuel droplets.

The precombustion chamber of the present invention is enhanced by incorporating along its interior walls electrical insulation and electrodes. By incorporating optional electrodes and optional insulation, and by maintaining the electrodes at a potential which is different from the injected droplets, the trajectory of the droplets may be shaped to enhance more complete burning.

OBJECTS OF THE INVENTION

Therefore, it is an object of the present invention to provide a highly efficient diesel engine.

Another object of the present invention is to provide a diesel engine which burns fuel more completely.

Still another object of the present invention is to provide a diesel engine whose particulate matter output is significantly decreased.

Yet another object of the present invention is to provide a diesel engine which decreases the production of nitrous oxides.

A further object of the present invention is to provide a precombustion chamber wherein the fuel is atomized as it is injected into the combustion chamber.

Still a further object of the present invention is to provide the combustion chamber with an electrostatic fuel injector.

Yet another object of the present invention is to provide a precombustion chamber with internal insulation and electrodes.

Other objects, advantages and novel features of the present invention will become apparent from the following detailed description of the invention when considered in conjunction with the accompanying drawings.

BRIEF DESCRIPTION OF THE DRAWINGS

FIG. 4 is a schematic view of a rotary switching device for switching high voltage between the various precombustion chambers.

FIG. 5 is a schematic representation of a conventional power supply.

DESCRIPTION OF THE PREFERRED EMBODIMENTS

In accordance with the present invention, there is provided an electrostatic injector for diesel engines wherein electrostatic forces in atomization produce fine fuel droplet sizes. Combustion theory and basic combustion experiments indicate that reducing fuel droplet size will enhance combustion and decrease the tendency for diesel engine combustion to produce particulates. The very small particle sizes, in the order of 0.1 to 10 microns required to effect this increased combustion efficiency, are produced by electrostatically charging the fuel as it passes from the electrostatic injector into the combustion chamber.

Figure 1:
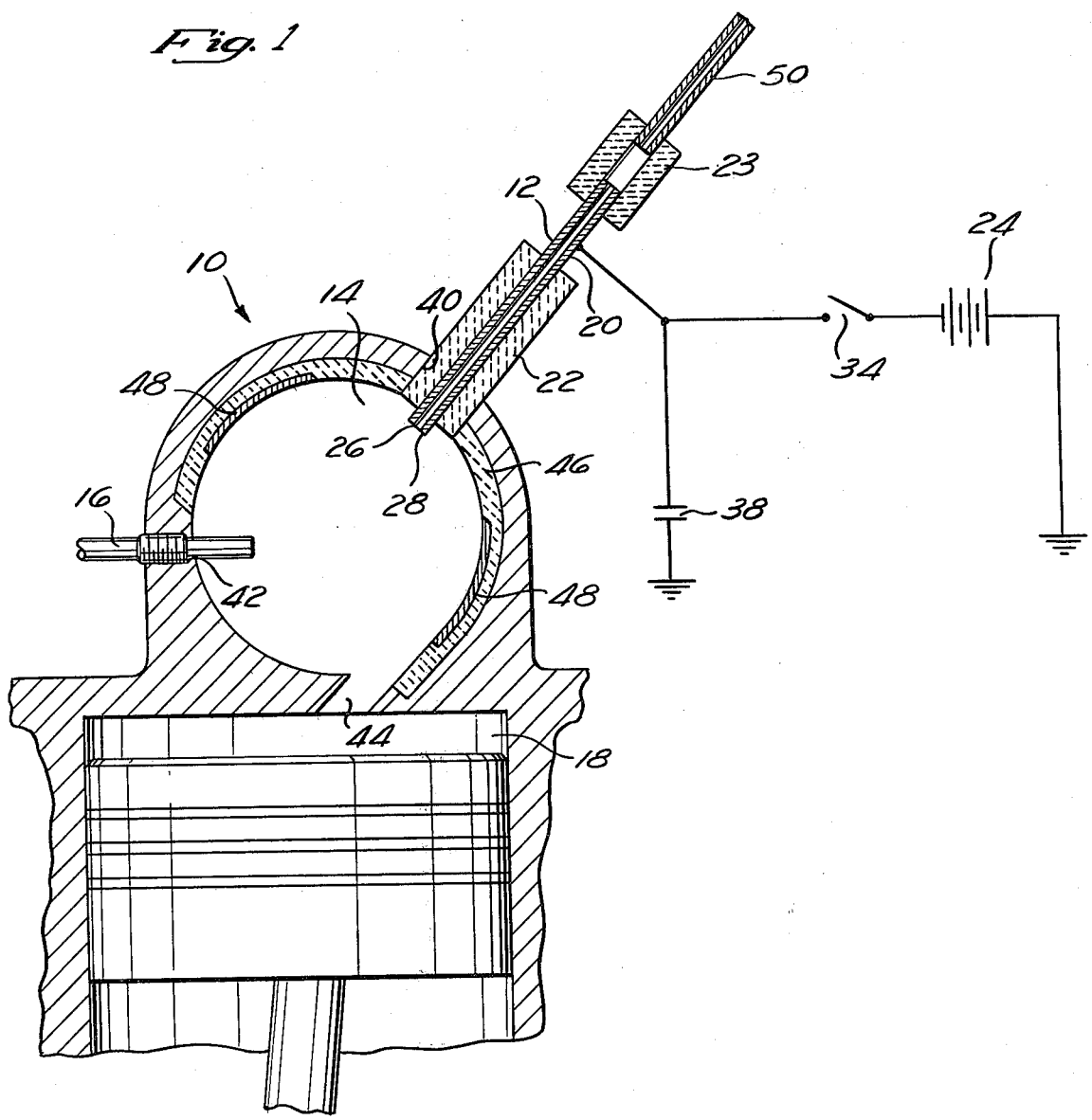
FIG. 1 is a schematic cross-sectional view of a precombustion chamber and electrostatic fuel injector.
Figure 2:
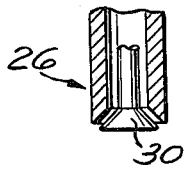
FIG. 2 is a schematic view of a poppet valve incorporated into the injector body.
Figure 3:
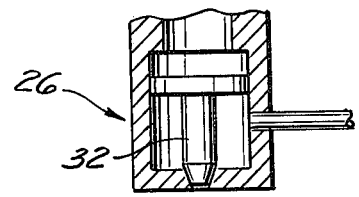
FIG. 3 is a schematic view of a pintle valve incorporated into the injector body.

Turning now to FIG. 1, there is shown the precombustor generally designated 10. Precombustor 10 basically comprises electrostatic injector 12, combustion chamber 14, and glow plug 16. It should be noted that although it is preferred to incorporate electrostatic fuel injector 12 into the precombustion chamber 14, the electrostatic injector 12 could be incorporated directy into engine cylinder 18.

Electrostatic fuel injector 12 comprises an electroconductive injector body 20, electrical insulating means 22 and 23, such as electrical insulating bushings, and a high voltage source 24. In the preferred operating conditions, electrostatic fuel injector body 20 further comprises a check valve 26 oriented near the exit zone 28 of the injector body 20. As an example of functional check valves 26 for this system, one may use poppet valve 30 or pintle valve 32. The metal parts of the injector 20 are charged by the high voltage power supply 24 which operates in the range of from about 10,000 to about 100,000 volts. This high voltage source 24 is similar in nature to the high voltage used in electron guns on televisions receivers or on electrostatic air filters. High voltage source 24 can be enhanced by interposing switch 34 between the high voltage source 24 and the injector body 20. A preferred switch 34 would be a rotary switch 36 such as a distributor or a solid-state switching mechanism which would direct the high voltage to the injector 20 slightly before the injection of fuel. The performance of the electrostatic fuel injector 12 can be further enhanced by incorporating a capacitor 38 in parallel with and matched to the high voltage power supply 24.

The power supply circuitry is generally well known in the art and comprises a circuit breaker or flip-flop circuit which would take the 12-volt battery power, convert it into an alternating positive and negative 12 volts, and put it through a transformer so as to raise it to a predetermined high voltage. It would then be rectified and put into a main storage capacitor 39 which would serve as a storage device. To avoid discharge when conditions in the precombustion chamber become conductive because of the presence of flame, it becomes desirable to add the aforementioned optional switch 34 or 36. Depending upon the type of switching mechanism incorporated, either a single power supply could be used to energize all the injectors of a multi-cylinder engine, or one power supply for each injector might be used.

FIG. 5 is a schematic representation of a conventional power supply. This power supply, as well as others, can be obtained or modified from the Sourcebook of Electronic Circuits, John Markus, McGraw Hill, 1968, included herein by reference.

It should be noted that the basic reason for any switching mechanism or capacitor or inline resistor even if you only had one cylinder would be to try to overcome the conductivity of the flame and combustion gases once ignition has occurred within the precombustion chamber.

Although any conventional precombustion chamber geometry will work with this invention, the preferred precombustion chamber 14 geometry is spherical. The precombustion chamber 12 includes a fuel spray nozzle port 40 through which electrostatic injector 12 is inserted, igniter port 42 opposed to said fuel spray nozzle port 40 for receiving a means for igniting the fuel-air mixture such as glow plug 16, and flow passage 44 through which air is injected into the precombustion chamber 14 and through which combusting gases escape to the engine cylinder 18. The precombustion chamber 14 may further be enhanced by the incorporation of electrical insulation 46 and electrodes 48. Examples of electrical insulation 46 include inserts or coatings of high-temperature ceramics, alumina or mullite.

In operation, the piston goes through the intake stroke and the compression stroke and near the end of the compression stroke fuel injection is initiated. Prior to fuel injection, operational switch 34 closes and the high voltage power supply 24 charges the injector body 20 and capacitor 38. Once fully charged, switch 34 opens and the fuel is then pumped through tubing 50, electrical insulating bushings 22 and 23, and into the injector body 20. As the fuel passes through injector body 20, it becomes electrostatically charged and the charge on the surface of the fuel droplets repels the particles from other portions of the liquid and from the injector tip itself. The repulsive forces pull off the tiny droplets and in that they have the same high charge, they have a tendency to repel each other, thereby resulting in a spreading and a rapid distribution of fuel particles into the air within the combustion chamber. By incorporating optional electrodes 48 and insulation 46 along the interior wall of the combustion chamber 14, and by maintaining the electrode portions of the inner wall of the combustion chamber at a potential which is different from the droplets, droplets are attracted toward the far wall or to the electrodes 48. This technique can be used to provide any droplet trajectory and thereby shape the droplet spray. The advantage of shaping trajectory would be to obtain a better distribution of particles, thus more complete burning and a reduction in the production of particulate matter.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A precombustor for use in diesel engines comprises:
   a precombustion chamber comprising:
      an injector port for housing an electrostatic injector;
      an ignitor port for housing an ignition means; and
      a flow passage substantially opposite said injector port for conveying air into said precombustion chamber and combusted gases from said precombustor to a diesel cylinder; and
   an electrostatic fuel injector, comprising:
      an electroconductive injector body having at least one fuel inlet and at least one fuel outlet;
      means for electrically insulating said injector body from said diesel engine; and
      means for charging said injector body to more than about 10,000 volts;
   wherein the interior of said precombustion chamber further comprises electrical insulation; and
   wherein said precombustion chamber has at least one electrode located along the interior walls for attracting or repelling the fuel droplets.

2. The electrostatic fuel injector of claim 1 wherein said injector body further comprises a check valve axially oriented within said injector body.

3. The electrostatic fuel injector of claim 2 wherein said check valve is a poppet valve.

4. The electrostatic fuel injector of claim 2 wherein said check valve is a pintle valve.

5. The electrostatic fuel injector of claim 1 wherein said means for electrically insulating said injector body from said diesel engine comprises insulating bushings.

6. The electrostatic fuel injector of claim 1 wherein said charging means, comprises:
   a voltage source of greater than about 10,000 volts; and
   a switching means interposed between said voltage source and said injector body.

7. The electrostatic fuel injector of claim 6 wherein said switching means is a rotary switch.

8. The electrostatic fuel injector of claim 6 wherein said charging means further comprises a high voltage capacitor matched to and connected in parallel with said high voltage source.

* * * * *